United States Patent Office 3,657,134
Patented Apr. 18, 1972

3,657,134
DEFLOCCULATION OF SOLID MATERIALS IN AQUEOUS MEDIUM
Thomas M. King, St. Louis, and Howard L. Vandersall, Ballwin, Mo., assignors to Monsanto Company, St. Louis, Mo.
No Drawing. Filed Apr. 13, 1970, Ser. No. 27,980
Int. Cl. C10m 3/38; B01j 13/00; C04b 33/12
U.S. Cl. 252—8.5 C
15 Claims

ABSTRACT OF THE DISCLOSURE

Epoxy ethane polyphosphonates having the formula

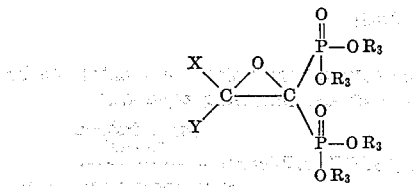

wherein X and Y are hereinafter defined and R is hydrogen or a metal ion, are disclosed as deflocculating agents in aqueous vehicles or systems containing finely divided solid materials such as oil well drilling muds.

This invention relates to aqueous dispersions of finely divided solid materials in a deflocculated condition and methods for their preparation. More particularly this invention relates to the use of certain epoxy ethane polyphosphonates as deflocculating agents for finely divided solid materials in an aqueous slurry.

Many industrial processes today use aqueous suspensions or slurries in which the water is used as the vehicle for transporting the solids. The phenomenon of deflocculation, that is, the separation of aggregates into smaller units, plays an important role in the use of slurry systems by altering the flow or rheological properties of the system. There are in use today many and various kinds of deflocculating agents, one class of which, the condensed phosphates, have gained widespread use in such slurry systems as oil well drilling muds, kaolin processing, wet processing of cement, water-base paint pigment suspensions and the like. However, their susceptibility to hydrolysis in aqueous slurry systems is well known, being primarily dependent on the temperature and pH conditions of the system. This limitation sometimes severely restricts their use. As can be appreciated, therefore, a "hydrolytically stable" deflocculating agent would represent an important advancement in this art.

Therefore, it is an object of this invention to provide improved aqueous dispersions of finely divided solid materials in a deflocculated condition.

It is another object of this invention to provide a process for dispersing in a deflocculated condition finely divided solid materials in an aqueous medium by use of a deflocculating agent.

A further object of this invention is to provide a "hydrolytically stable" deflocculating agent for use in dispersing in a deflocculated condition finely divided solid materials in an aqueous medium.

A further object of this invention is to provide an improved deflocculating agent for use in such slurry systems as oil well drilling muds, kaolin processing, wet processing of cement, water-base paint pigment suspensions and the like.

Other objects will become apparent from the detailed description and the claims.

It has now been discovered that aqueous dispersions of finely divided solid materials in a deflocculated condition can be prepared by incorporating therein a minor amount of one or more substituted epoxy ethane polyphosphonates which collectively have the following generic formula:

(I) 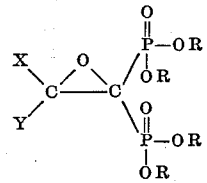

In the above Formula I, X and Y are each alike or unlike and are from the group hydrogen, alkyl containing from 1 to 30 (preferably 1 to 8 and more preferably 1 to 4) carbon atoms (including branch and straight chain members), phenyl, halogen (preferably chlorine, bromine, fluorine and iodine) substituted phenyl,

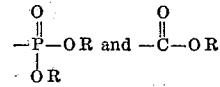

wherein R is hereinafter defined.

In Formula I, R is from the group metal ions and hydrogen. The aforementioned metal ions are cations which are capable of forming a water-soluble salt and are from the group of metals which includes without limitation alkali metals such as sodium, lithium and potassium; ammonium ions; and alkyl ammonium ions. In particular, those alkyl ammonium ions derived from amines having a low molecular weight, such as below about 300, and more particularly the alkyl amines, alkylene amines, and alkanol amines, containing not more than two amine groups, such as ethyl amine, diethylamine, propyl amine, propylene diamine, hexyl amine, 2-ethylhexylamine, N-butylethanol amine, triethanol amine, and the like, are the preferred amines.

It is to be understood that all of the compounds falling within the above Formula I and as heretofore defined are generically described herein as "epoxy ethane polyphosphonates" or "EEPP." In other words, then, the acids, salts and mixtures thereof are all generically described herein as epoxy ethane polyphosphonates or EEPP.

In conjunction with the generic Formula I, this includes, without limitation, the following sub-generic formulae:

(II) 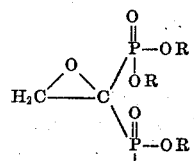

(III) 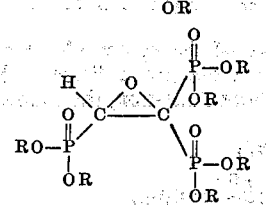

(IV) 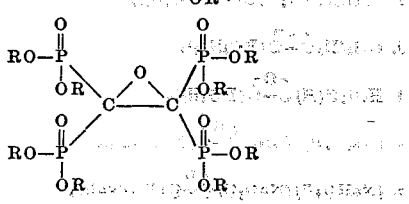

(V) 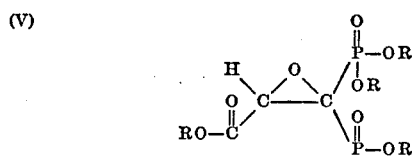

(VI) 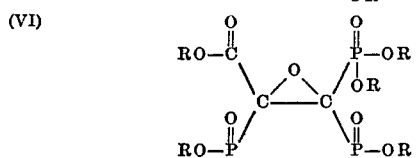

(VII) 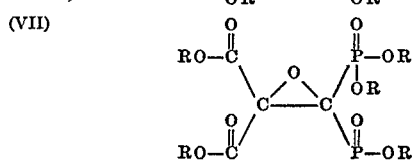

(VIII) 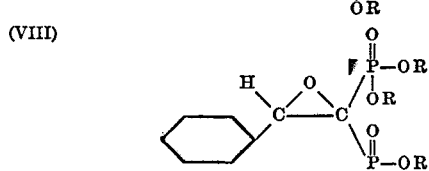

(IX) 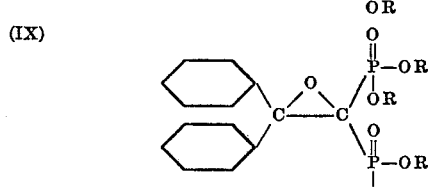

(X) 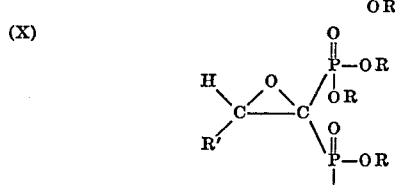

(XI) 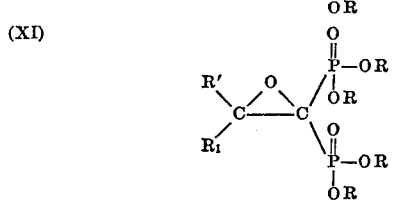

In the above Formulae X and XI, R' is an alkyl group containing from 1 to 30, preferably 1 to 8 and more preferably 1 to 4, carbon atoms. It is to be understood that R' includes straight and branched chain lengths and isomers.

As illustrative of the epoxy ethane polyphosphonates which fall within the above Formula I, there may be mentioned, without limitation, the following compounds:

1. $H_2\overset{\displaystyle\frown{O}}{C-C}(PO_3H_2)_2$

2. $(C_6H_5)(HO_2C)\overset{\displaystyle\frown{O}}{C-C}(PO_3H_2)_2$

3. $CH_3(H)\overset{\displaystyle\frown{O}}{C-C}(PO_3Na_2)_2$

4. $H_2O_3P(H)\overset{\displaystyle\frown{O}}{C-C}(PO_3H_2)_2$

5. $(Na_2O_3P)(C_6H_5)\overset{\displaystyle\frown{O}}{C-C}[PO_3(Na)_2]_2$

6. $(NaHO_3P)(NaO_2C)\overset{\displaystyle\frown{O}}{C-C}(PO_3NaH)_2$

7. $ClH_4C_6(H)\overset{\displaystyle\frown{O}}{C-C}(PO_3H_2)_2$

8. $H_5C_6(H_2O_3P)\overset{\displaystyle\frown{O}}{C-C}(PO_3H_2)_2$

9. $H_9C_4(H_2O_3P)\overset{\displaystyle\frown{O}}{C-C}(PO_3H_2)_2$

10. $(K_2O_3P)_2\overset{\displaystyle\frown{O}}{C-C}(PO_3K_2)_2$

11. $HO_2C(H)\overset{\displaystyle\frown{O}}{C-C}(PO_3H_2)_2$

12. $NaO_2C(C_2H_5)\overset{\displaystyle\frown{O}}{C-C}(PO_3Na_2)_2$

13. $(HO_2C)_2\overset{\displaystyle\frown{O}}{C-C}(PO_3H_2)_2$

14. $(NaO_2C)(ClH_4C_6)\overset{\displaystyle\frown{O}}{C-C}(PO_3Na_2)_2$

15. $(H_5C_6)_2\overset{\displaystyle\frown{O}}{C-C}(PO_3Na_2)_2$

In general, the epoxy ethane polyphosphonates can be prepared according to the following equations:

(1) 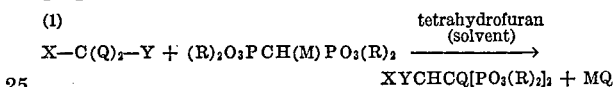

(2) 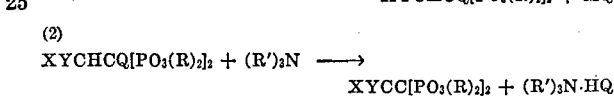

(3) 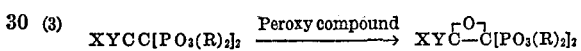

In the above equations, X and Y and R are the same as herein defined; (R')$_3$N represents a tertiary amine such as triethyl amine; M represents a metal ion such as sodium; and Q represents a halogen such as chlorine; and the peroxy compound may be from the group organic hydroperoxide, hydrogen peroxide, organic per acids or mixtures thereof.

In carrying out the aforementioned reactions as represented by Equations 1, 2 and 3, generally the reaction can be conducted at temperatures between about 0° C. and 100° C., and preferably from about 15° C. to about 75° C. It is also within the scope of these processes to utilize atmospheric, subatmospheric (e.g., ½ to 760 mm. Hg) or super-atmospheric (e.g., up to 10 atmospheres) pressure.

By the term "hydrolytically stable" as used herein is meant a substantial resistance by the deflocculating agent to hydrolysis or degradation under various pH and temperature conditions. For example, a 20 gram sample of tetrasodium epoxy ethane 1,1-diphosphonate,

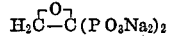

was dissolved in 100 ml. of water. A 25 ml. portion of the solution was added to a 25 ml. portion of 12 M HCl to give a 10% solution of the agent in HCl. Another 25 ml. portion of the solution was added to a 25 ml. portion of 10% NaOH to give a 10% solution of the agent in a 5% solution of NaOH. The foregoing 10% solutions were boiled for a period of four hours, at the end of which both solutions exhibited substantially no change in physical properties. Nuclear magnetic resonance spectra showed the two 10% solutions to be substantially identical with unheated fresh 10% solutions of the agent in similar acid and alkaline solutions, thus establishing the resistance of the agent to hydrolysis or degradation under severe temperature and pH conditions. It should be noted that all known polyphosphates, whether in the acid, salt or ester form, would hydrolyze or degrade completely under the foregoing conditions. Another sample, in this instance 2 grams of the anhydrous tetra sodium epoxy ethane 1,1-diphosphonate powder, was heated on a thermogravimetric balance. Below a temperature of about 305° C. less than 1% weight loss resulted. X-ray diffraction patterns of the heated sample and an unheated sample were substantially identical. As is believed apparent from the foregoing, the deflocculating agents of the instant invention are substantially hydrolytically stable and by exhibiting deflocculating properties comparable to the polyphosphates can be used advantageously in many various aqueous slurry applications.

Generally stated, this invention relates to the use of EEPP as improved deflocculating agents for aqueous dispersions of finely divided solid materials, and, in addition, this invention also relates to the aqueous slurry compositions resulting therefrom and containing the improved deflocculating agent. It is to be understood that all water soluble salts of these EEPP are generally suitable for use. While the water soluble alkali metal salts, such as the sodium, potassium and lithium salts are preferred, it is also within the scope of the present invention to use the alkaline earth salts, such as the calcium and magnesium salts.

The deflocculating agents of the present invention can be advantageously used for deflocculation purposes with many and various finely divided solid materials which are capable of being dispersed in an aqueous vehicle. Illustrative of such finely divided materials are organic solid materials such as coal, including lignite (brown coal), bituminous (soft coal), anthracite (hard coal), charcoal and the like, and inorganic solid materials such as barium sulfate, barium carbonate, various clays, Fuller's earth, bauxite, phosphate containing ores, argillaceous materials, calcareous materials, pigments which include ferric oxide, iron blues, red lead, white lead (basic carbonate), white lead (basic sulfate), lead chromate, zinc oxide, zinc chromate, zinc sulfide, lithopone, chromium oxide, titanium dioxide (anatase), titanium dioxide (rutile), antimony oxide, cadmium sulfide, lead titanate, extended pigments which include titanium-barium, titanium-calcium, zinc sulfide-magnesium or any combinations of pigments used to provide pigments of other than the primary colors which include lead chromate-lead oxide, iron blue and lead chromate, and the like. As being illustrative of the foregoing solid materials in slurry systems are oil well drilling muds, kaolin processing, wet processing of cement, water-base paint pigment suspensions, coal processing and the like. The foregoing solid materials and specific areas of utilizations are by no means the extent of their use, and therefore, the invention is not intended to be limited thereto.

The amounts of the deflocculating agent necessary to deflocculate the slurry system in any specific instance depends, inter alia, on the viscosity desired, conditions of use, contaminants and the like, but in any event only minor amounts are usually sufficient, i.e., as little as 0.01% by weight of solids can give improved results and usually about 1% by weight of solids suffices in most applications; however, larger amounts can be used if one so desires. Because it is believed that the ability of the deflocculating agent to deflocculate is enhanced by an increase in the number of phosphonic acid groups which ionize, it is preferred that the slurry system be at a pH of 5 or above.

The deflocculating agents of the present invention may be added to the slurry system as an aqueous solution or as a solid in powdered form or it may be incorporated as a dry solid with the substantially dry solid materials prior to being added to the aqueous vehicle. Alternatively, the dispersion and mixing may take place simultaneously by intimately mixing the solid materials with water and the deflocculating agent.

As previously mentioned the deflocculating agent is especially suited for use in kaolin clay slurries. In kaolin procesing it is common to find kaolin slurries used in transporting kaolin from the mine to the plant and the processing in the plant may also be performed on the slurries. Customarily the processing is done on a deflocculated-flocculated-redeflocculated slurry system with the redeflocculation or final deflocculation accomplished prior to spray drying or drum drying. In addition, kaolin is sometimes shipped to users in the slurry form. As can be appreciated, contaminants in the kaolin, effects of flocculating additives and other agents used in the process, and the variations in temperature encountered are some of the severe conditions placed on the functioning of the deflocculating agent. It is therefore believed appreciated that a deflocculating agent which is relatively hydrolytically stable would be a distinct advantage in kaolin slurry processing.

The amount necessary for the deflocculating agent to deflocculate the kaolin slurry is dependent on many factors, the most important of which is the viscosity desired, however, in any case only a minor amount in the order of about .01 to 1% by weight of solids is usually sufficient.

The EEPP deflocculating agents are especially suited for use in drilling muds. High temperatures at substantial depths which sometimes reach 250° C., contamination by salt brines or as a result of cementing operations are among the factors which cause undesirable variations in viscosity properties of the muds. The ability of the drilling muds to maintain a suitable viscosity over a wide range of temperatures and pH conditions is, therefore, a distinct and important requirement. It can be appreciated that since the present invention deflocculating agents, which are substantially hydrolytically stable over a wide range of temperature and pH conditions, are well suited for use in drilling muds.

The drilling muds may be comprised of any conventional type material such as hydratable clay or colloidal clay bodies which are capable of being deflocculated or dispersed in an aqueous vehicle. Such clay materials as Wyoming bentonite, commercial medium-yield drilling clays mixed in various parts of the country such as Texas, Tennessee, and Louisiana are among those which are frequently encountered. Weighting material added to increase specific gravity such as barytes, iron oxide, calcium carbonate, silica and the like may also be included. The aqueous vehicle may be any type of suitable fresh or salt water such as is obtained from wells, lakes or the sea. In addition, the drilling muds of the invention may contain other additives, such as caustic, soda ash, quebracho, lime, cement, gypsum and the like.

The quantities of EEPP to be added will vary with, among other things, the properties desired and the type of clay used. Under normal conditions quantities of the deflocculating agent within the range of about .01 to 1% by weight of solids are usually usable. It is to be understood that higher amounts (e.g. up to 5% by weight) can be used if one so desires.

The EEPP can be added directly to the drilling fluid as a dry powder, as a slurry suspended in a suitable liquid, or as a solution in a liquid such as water, and they may be incorporated therein at any convenient point in the mud circulation system. In some cases, it is advantageous to first prepare a substantially dry concentrate by adding the deflocculating agent to the clay and, if desired, the other above-mentioned additives, prior to incorporating such in the aqueous vehicle to prepare the drilling fluid. In such cases the concentrate drilling mud can contain some water (usually below about 10% by weight of the mud solids) such as the normal moisture content of the air dried mud solids, generally very little water is desired since the aqueous vehicle is added later when the drilling fluid is prepared.

Aqueous dispersions of other types of finely divided solid materials in a deflocculated condition can be prepared using the EEPP. Such slurry systems as water base paint pigment suspensions, cement slurries and coal slurries can also be improved by the addition of minor amounts of the deflocculating agent.

The invention will be further illustrated but is not limited by the following examples.

EXAMPLE I

In this example, deflocculating agents representative of the instant invention are tested along with the widely used polyphosphate deflocculants, i.e., sodium tripolyphosphate, tetrasodium pyrophosphate and sodium hexametaphosphate in a kaolin slurry. The kaolin which is used in the evaluation is essentially free of impurities and is mixed with distilled water to produce an aqueous slurry with a solids content of about 55%. The initial kaolin slurry has a pH of about 4. The final pH of the slurries after the deflocculating agents are added varies from about 7 to 8.4 except after adding the deflocculant sodium hexametaphosphate which slurry has a final pH of about 4.5. Viscosity measurements are made in a Stormer viscometer with hollow rotor and cup with side vanes only with apparent viscosity determined at 300 r.p.m. The results of the test are tabulated below:

TABLE 1

| Deflocculating agent | Deflocculating agent [1] | Apparent viscosity [2] |
|---|---|---|
| (1) Tetrasodium pyrophosphate | 0 | Plastic |
|  | .1 | 80 |
|  | .15 | 50 |
|  | .2 | 40 |
|  | .3 | 40 |
|  | .4 | 40 |
| (2) Sodium tripolyphosphate | 0 | Plastic |
|  | .1 | 110 |
|  | .15 | 50 |
|  | .2 | 40 |
|  | .3 | 40 |
|  | .4 | 40 |
| (3) Sodium hexametaphosphate | 0 | Plastic |
|  | .1 | 90 |
|  | .15 | 50 |
|  | .2 | 40 |
|  | .3 | 40 |
|  | .4 | 40 |
| (4) Tetrasodium epoxy ethane 1,1-diphosphonate | 0 | Plastic |
|  | .1 | 1,080 |
|  | .15 | 90 |
|  | .2 | 50 |
|  | .3 | 50 |
|  | .4 | 50 |
| (5) Tetrasodium 2-phenyl-carboxy epoxy ethane 1,1-diphosphonate | 0 | Plastic |
|  | .1 | 950 |
|  | .15 | 200 |
|  | .2 | 60 |
|  | .3 | 40 |
|  | .4 | 40 |
| (6) Tetrasodium 2-methyl epoxy ethane 1,1-diphosphonate | 0 | Plastic |
|  | .1 | 770 |
|  | .15 | 130 |
|  | .2 | 40 |
|  | .3 | 40 |
|  | .4 | 40 |
| (7) Hexasodium epoxy ethane 1,1,2-triphosphonate | 0 | Plastic |
|  | .1 | 1,010 |
|  | .15 | 350 |
|  | .2 | 90 |
|  | .3 | 50 |
|  | .4 | 40 |
| (8) Hexasodium 2-phenyl epoxy ethane 1,1,2-triphosphonate | 0 | Plastic |
|  | .1 | 810 |
|  | .15 | 140 |
|  | .2 | 60 |
|  | .3 | 40 |
|  | .4 | 40 |
| (9) Pentasodium 2-carboxy epoxy ethane 1,1,2-triphosphonate | 0 | Plastic |
|  | .1 | 880 |
|  | .15 | 100 |
|  | .2 | 50 |
|  | .3 | 40 |
|  | .4 | 40 |
| (10) Tetrasodium 2-chlorophenyl epoxy ethane 1,1-diphosphonate | 0 | Plastic |
|  | .1 | 960 |
|  | .15 | 130 |
|  | .2 | 60 |
|  | .3 | 40 |
|  | .4 | 40 |
| (11) Hexasodium 2-phenyl epoxy ethane 1,1,2-triphosphonate | 0 | Plastic |
|  | .1 | 1,030 |
|  | .15 | 90 |
|  | .2 | 50 |
|  | .4 | 40 |
|  | .5 | 40 |
| (12) Hexasodium 2-butyl epoxy 1,1,2-triphosphonate | 0 | Plastic |
|  | .1 | 1,000 |
|  | .15 | 150 |
|  | .2 | 60 |
|  | .3 | 40 |
|  | .4 | 40 |

TABLE 1.—Continued

| Deflocculating agent | Deflocculating agent [1] | Apparent viscosity [2] |
|---|---|---|
| (13) Octasodium epoxy 1,1,2,2-tetraphosphonate. | 0 | Plastic |
|  | .1 | 910 |
|  | .15 | 110 |
|  | .2 | 70 |
|  | .3 | 40 |
|  | .4 | 40 |
| (14) Pentasodium 2-carboxy epoxy ethane 1,1-diphosphonate. | 0 | Plastic |
|  | .1 | 1,070 |
|  | .15 | 290 |
|  | .2 | 100 |
|  | .3 | 40 |
|  | .4 | 40 |
| (15) Pentasodium 2-phenyl-2-carboxy epoxy ethane 1,1-diphosphonate. | 0 | Plastic |
|  | .1 | 920 |
|  | .15 | 180 |
|  | .2 | 50 |
|  | .3 | 40 |
|  | .4 | 40 |
| (16) Hexasodium 2-dicarboxy epoxy ethane 1,1-diphosphonate. | 0 | Plastic |
|  | .1 | 760 |
|  | .15 | 80 |
|  | .2 | 40 |
|  | .3 | 40 |
|  | .4 | 40 |
| (17) Pentasodium 2-carboxy-2-chlorophenyl ethane 1,1-diphosphonate. | 0 | Plastic |
|  | .1 | 1,090 |
|  | .15 | 140 |
|  | .2 | 50 |
|  | .3 | 50 |
|  | .4 | 40 |
| (18) Tetrasodium 2-diphenyl epoxy ethane 1,1-diphosphonate. | 0 | Plastic |
|  | .1 | 1,040 |
|  | .15 | 130 |
|  | .2 | 70 |
|  | .3 | 40 |
|  | .4 | 40 |

[1] Solids basis (percent).
[2] Cp. at 300 r.p.m. on Stormer.

The results of Table 1 show that in each case the deflocculating agents representative of the instant invention, i.e. (4) through (18) when added in very minor amounts of .1 to about .2 percent by weight on a solids basis effected a dramatic change in the viscosity of the slurry and when used in amounts greater than about .15% were equally as effective as the widely used polyphosphate deflocculating agents, i.e. (1), (2) and (3).

EXAMPLE II

Example I above is repeated with the exception that the tetrapotassium salts of the present invention deflocculating agents are used. The end viscosity results of this test are substantially the same as those set forth in Table 1.

EXAMPLE III

Example I above is repeated with the exception that the acid forms of the sodium salts of the EEPP are used instead of the salts per se. In this case the pH of the individual kaolin slurries are all below pH 5. The viscosity data using the acids per se are similar to those data using the salts per se. At deflocculating agent (EEPP) concentrations above about .1%, there is a substantial reduction in the viscosity.

EXAMPLE IV

Deflocculating agents representative of the instant invention, i.e. compounds heretofore designated Nos. 1 through 15 are tested along with the widely used polyphosphate deflocculants, i.e., sodium tripolyphosphate and tetrasodium pyrophosphate, in a kaolin slurry. The kaolin used in the evaluation is of a mine grade quality and is mixed with distilled water to produce an aqueous slurry with a solids content of about 70%. The slurry throughout the evaluation is maintained at a pH of about 7 with NaOH. Viscosity measurements were made with the Rotovisco rotational viscometer. The data are converted into apparent Newtonian viscosities (rate of shear of 249 sec.$^{-1}$).

The data show that the defluocculating agents as described above (compound Nos.) when added in very minor amounts, i.e., about .1%, effected a dramatic change in the viscosity of the slurry while the widely used polyphosphate deflocculants are substantially ineffective when used in the same amounts. In addition, it is found that deflocculating agents (i.e., the above compounds Nos.) are equally as effective as the polyphosphate deflocculants when used in amounts between about .2 and .35%.

As can be appreciated, therefore, EEPP are extremely versatile deflocculating agents and it is intended that this invention cover their broad use in aqueous dispersions of finely divided solid materials and the resulting compositions therefrom. It is within the scope of the present invention that other deflocculating agents, such as those described in U.S. 3,346,487 and U.S. 3,346,488, both of which are incorporated herein by reference, can be used in combination with the present invention deflocculation agents where one so desires.

What is claimed is:

1. A slurry consisting essentially of an aqueous vehicle containing finely divided solid materials selected from the class consisting of coal and inorganic solid materials selected from the group consisting of clays, bauxite, phosphate-containing ores, cements and pigments and, as a deflocculating agent to disperse said solid materials into a finely divided dispersion, an epoxy ethane polyphosphonate having the formula

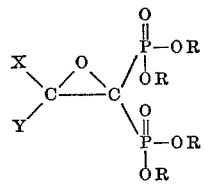

wherein X and Y are each like or unlike and are each selected from the group consisting of

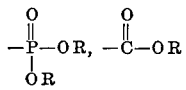

phenyl, halogen substituted phenyl, hydrogen and alkyl which contains from 1 to 30 carbon atoms, and R is selected from the group consisting of hydrogen, cations which are capable of forming a water soluble salt and which are selected from the group consisting of alkali metals, alkaline earth metals, ammonium ions, and alkyl ammonium ions having a molecular weight less than 300, and mixtures thereof.

2. The slurry as set forth in claim 1 wherein R is hydrogen.

3. The slurry as set forth in claim 1 wherein R is a metal ion selected from the group consisting of alkali metals, alkaline earth metals, and mixtures thereof.

4. The slurry as set forth in claim 1 wherein R is sodium.

5. A slurry consisting essentially of an aqueous vehicle containing inorganic finely divided solid materials selected from the group consisting of barium sulfate, barium carbonate, clays, bauxite, phosphate-containing ores, cements and pigments and, as a deflocculating agent to disperse said solid materials into a finely divided dispersion, an epoxy ethane polyphosphonate having the formula

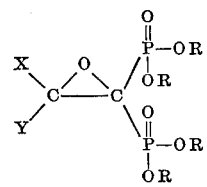

wherein X and Y are each like or unlike and are each selected from the group consisting of

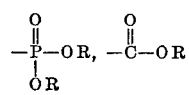

phenyl, halogen substituted phenyl, hydrogen and alkyl which contains from 1 to 30 carbon atoms, and R is selected from the group consisting of hydrogen, cations which are capable of forming a water soluble salt and which are selected from the group consisting of alkali metals, alkaline earth metals, ammonium ions, and alkyl ammonium ions having a molecular weight less than 300, and mixtures thereof.

6. The slurry as set forth in claim 5 wherein said epoxy ethane polyphosphonate is epoxy ethane 1,1-diphosphonic acid or its water soluble sodium salt.

7. A kaolin slurry consisting essentially of an aqueous suspension of kaolin and, as a deflocculating agent, an epoxy ethane polyphosphonate having the formula

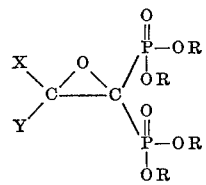

wherein X and Y are each like or unlike and are each selected from the group consisting of

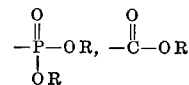

phenyl, halogen substituted phenyl, hydrogen and alkyl which contains from 1 to 30 carbon atoms, and R is selected from the group consisting of hydrogen, cations which are capable of forming a water soluble salt and which are selected from the group consisting of alkali metals, alkaline earth metals, ammonium ions, and alkyl ammonium ions having a molecular weight less than 300, and mixtures thereof.

8. The slurry as set forth in claim 7 wherein R is hydrogen.

9. The slurry as set forth in claim 7 wherein R is a metal ion selected from the group consisting of alkali metals, alkaline earth metals, and mixtures thereof.

10. The slurry as set forth in claim 7 wherein R is sodium.

11. A drilling fluid consisting essentially of an aqueous suspension of clay and, as a deflocculating agent, an epoxy ethane polyphosphonate having the formula

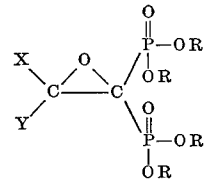

wherein X and Y are each like or unlike and are selected from the group consisting of

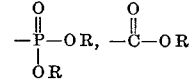

hydrogen, phenyl, halogen substituted phenyl, and alkyl which contains from 1 to 30 carbon atoms; and R is selected from the group consisting of hydrogen, cations which are capable of forming a water soluble salt and which are selected from the group consisting of alkali metals, alkaline earth metals, ammonium ions, and alkyl ammonium ions having a molecular weight less than 300, and mixtures thereof.

12. The fluid as set forth in claim 11 wherein R is hydrogen.

13. The fluid as set forth in claim 11 wherein R is a metal ion selected from the group consisting of alkali metals, alkaline earth metals, and mixtures thereof.

14. The fluid as set forth in claim 11 wherein R is sodium.

15. A drilling mud concentrate composition useful when incorporated in an aqueous vehicle as a drilling fluid consisting essentially of clay and, as a deflocculating agent, an epoxy ethane polyphosphonate having the formula

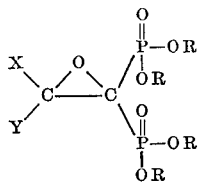

wherein X and Y are each like or unlike and are each selected from the group consisting of

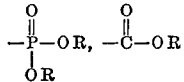

phenyl, halogen substituted phenyl, hydrogen and alkyl which contains from 1 to 30 carbon atoms, and R is selected from the group consisting of hydrogen, cations which are capable of forming a water soluble salt and which are selected from the group consisting of alkali metals, alkaline earth metals, ammonium ions, and alkyl ammonium ions having a molecular weight less than 300, and mixtures thereof.

References Cited

UNITED STATES PATENTS 3,346,487 10/1967 Irani et al. _____ 252—8.5
3,346,480 10/1967 Lyons et al. _____ 252—8.5

OTHER REFERENCES

Reuter et al., German application 1,046,047, printed Dec. 11, 1958 (KL 12026/01), 2 pages spec.

HERBERT B. GUYNN, Primary Examiner

U.S. Cl. X.R.

44—51; 106—72, 90, 308 Q, 308 N; 252—311, 313 R, 351, 356, 357; 260—348 R, 348 A